United States Patent
Robinson et al.

(12)

(10) Patent No.: US 6,188,955 B1
(45) Date of Patent: Feb. 13, 2001

(54) METHOD AND APPARATUS FOR STORING CARTOGRAPHIC ROUTE DATA

(75) Inventors: Stephen C. Robinson, Olathe; Darin J. Beesley, Overland Park; Thomas H. Walters, Gardner, all of KS (US)

(73) Assignee: Garmin Corporation (TW)

( * ) Notice: Under 35 U.S.C. 154(b), the term of this patent shall be extended for 0 days.

(21) Appl. No.: 09/223,553

(22) Filed: Dec. 30, 1998

(51) Int. Cl.[7] ................................................. G06F 165/00
(52) U.S. Cl. ........................... 701/200; 701/25; 701/201; 701/206; 701/209; 701/208; 701/211; 340/988; 340/990; 73/178 R
(58) Field of Search .................................... 701/200, 115, 701/206, 208, 209, 212, 300, 23, 25, 201; 340/988, 990, 995; 73/178 R

(56) References Cited

U.S. PATENT DOCUMENTS

| | | | |
|---|---|---|---|
| 4,212,067 | * 7/1980 | Henderson | 701/300 |
| 5,502,640 | 3/1996 | Yagyu et al. | 364/443 |
| 5,629,854 | * 5/1997 | Schulte | 701/207 |
| 5,936,553 | * 8/1999 | Kabel | 340/995 |
| 6,006,161 | * 12/1999 | Katou | 701/212 |

* cited by examiner

Primary Examiner—William A. Cuchlinski, Jr.
Assistant Examiner—Gertrude Arthur
(74) Attorney, Agent, or Firm—Shook, Hardy & Bacon LLP

(57) ABSTRACT

A method and device implementing a three-level hierarchy for storing, recalling and processing navigational and graphical data. A vehicle is equipped with an electronic navigation thoroughfare planning device capable of calculating the distance to a desired thoroughfare. To calculate a distance, a driver inputs a plurality of variables, including cartographic data and a final desired destination, as well as several potential additional variables. Upon receiving the driver inputs, the navigation device implements a three-level hierarchy for storing, recalling and processing cartographic data. After the cartographic data is stored in memory, the navigation unit can calculate distance to a thoroughfare utilizing a cascading search method beginning with searching the most specific first level and progressing to the broader second and third levels until a common network between the two locations is established. The navigation device can also utilize the three level hierarchy to display cartographic data as a graphical map on the unit utilizing the same cascading method to display detail on the display screen and locate the specific details on any coordinate on the screen. Therefore the navigation unit utilizes the same three level hierarchy to calculate distance to a desired destination and to display a graphical representation of the map.

10 Claims, 13 Drawing Sheets

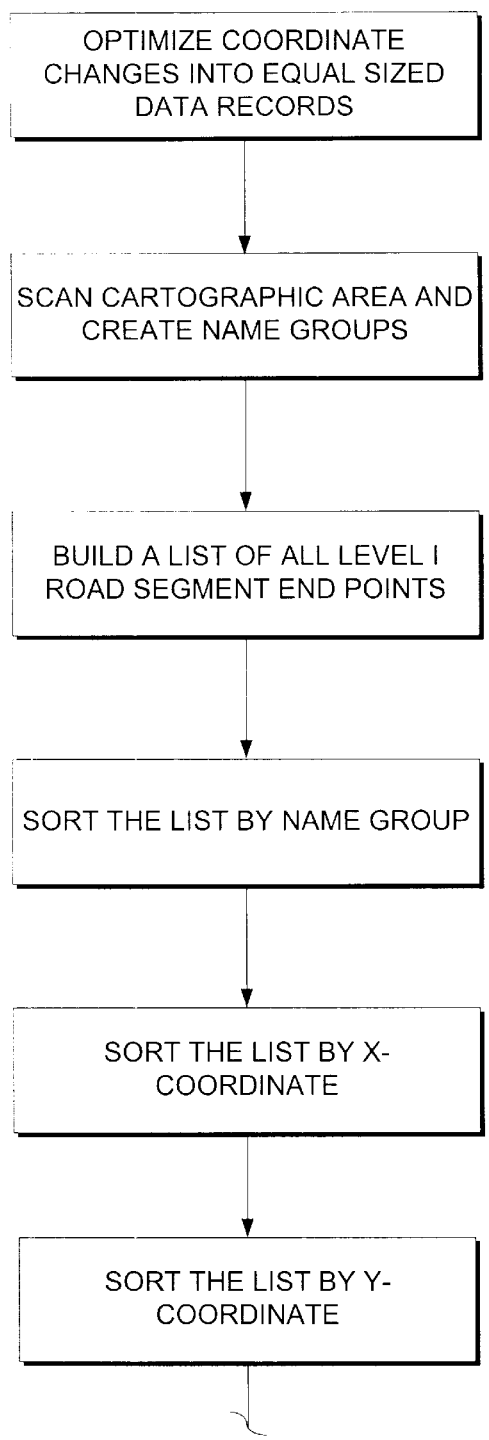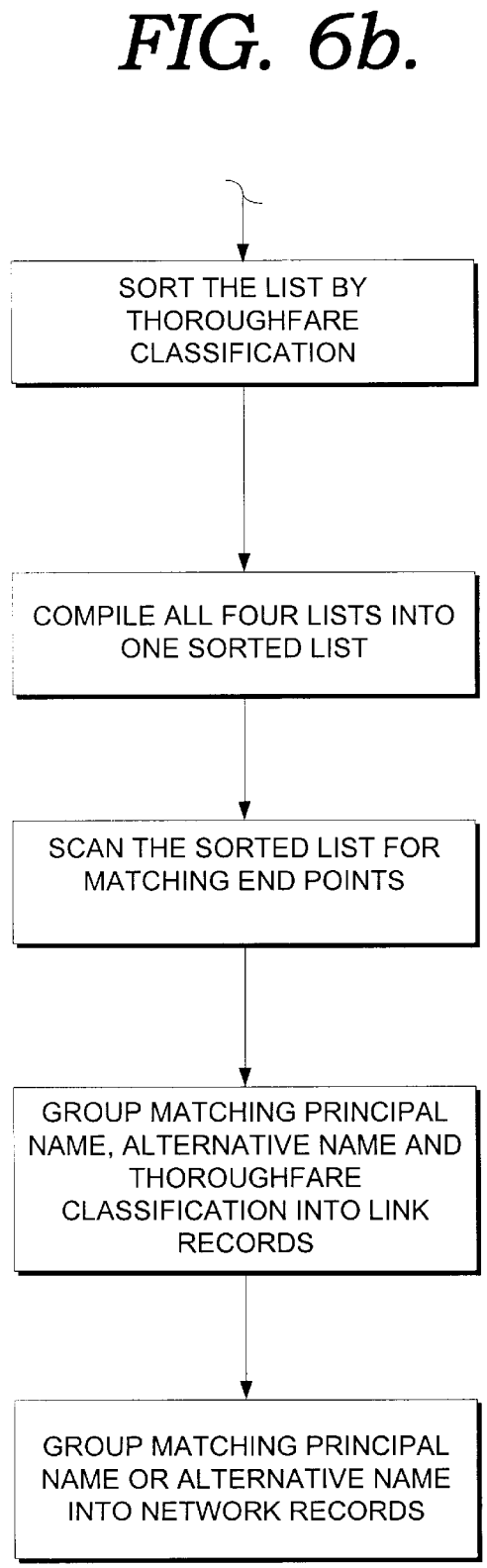
FIG. 6a.
FIG. 6b.

METHOD AND APPARATUS FOR STORING CARTOGRAPHIC ROUTE DATA

BACKGROUND OF THE INVENTION

1. Field of Invention

In general, this invention relates to the storage of geographic feature data and more particularly, to a method and apparatus for storing geographic coordinate data in an efficient manner to be utilized for both graphical and navigational processes.

2. Description of the Related Art

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost. Some of the higher cost systems implement a nodal analysis in which the route planning system determines every potential path from a present location to a desired location from data stored in memory. The route planning system then examines each potential path and eliminates paths by built-in criteria such as type of road traversed, shortest distances or user inputted preferred routes. The higher cost route planning systems require a great amount of memory storage space to store every potential route, as well as a need for a powerful processor to analyze the enormous amount of data stored in the memory. These route planning systems provide very accurate route planning data with little or no user intervention. While highly accurate navigational devices eliminate user intervention, their corresponding high cost eliminates a potential market which is unwilling to pay the cost associated with the accuracy and the ease of little intervention.

On the other end of the cost spectrum, some lower cost route planning systems implement a straight line approach in determining the distance between a desired destination and a current location. In this approach, the processor creates a straight line from the present location to the final destination and measures that straight line distance. The low cost system route planning data can be highly inaccurate because the system does not take into account actual thoroughfare layouts. For example, if a desired destination is on a mountain, the straight line distance from a current location might be only six miles. However, if the only available road to that destination is a windy road around the mountain entailing 30 miles of actual driving, the route planning distance calculated by a low cost system implementing the straight line method will be inaccurate. Because the low cost systems are so inaccurate, the practicality of their implementation is reduced by their large potential for error.

In order to effectuate a route planning method, most systems require the cartographic data to be stored as a record in memory. Additionally, many of the prior art systems also require the same cartographic data to be stored as a record in memory a second time for use in graphically representing the cartographic data on a display screen. Because the data contained within both records is repetitive, the redundancy creates a burden on the memory resources of the route planning system. This burden increases substantially in the higher cost systems because of the larger amounts of data needed by the system. Thus, both the high cost and the low cost navigational devices unduly burden system resources by the use of separate navigation and graphical record banks.

Current prior art systems have created a spectrum of products in which the degree of navigational accuracy is dictated primarily by the cost of the system. The lower cost systems currently offer a low degree of accuracy inadequate for users. In addition, both the higher cost and the lower cost system burden overall navigational system resources by the duplication of cartographic data. Therefore, there exists a need for a navigational route planning device which is more accurate than current low cost systems, without requiring the more expensive system resources. In addition, there is also a need for a navigational route planning device that does not unnecessarily burden system resources with redundant, duplicative cartographic data

SUMMARY OF THE INVENTION

Based on the above noted deficiencies in the related art, it is an object of the present invention to provide a low cost navigational route planning system which is more accurate than current low cost systems with minimal user intervention. It is the further object of the present invention to eliminate any unnecessary duplicative cartographic data stored in memory. Finally, it is the object of the present invention to provide an efficient format for storing and recalling navigational and graphical data in one memory location.

These and other objects of the present invention are achieved by a method and device implementing a three-level hierarchy for storing, recalling and processing navigational and graphical data. A vehicle is equipped with an electronic navigation route planning device of the present invention capable of calculating the distance to a desired destination along a desired route and displaying a geographical representation of that route. To initiate the system, a driver inputs a plurality of variables, including the cartographic data and a final desired destination, as well as several potential additional variables such as driver identity, thoroughfare preferences, thoroughfare class limitations or display format preferences. Alternatively, the cartographic data may be prestored in the navigation device. Upon receiving the driver inputs, the navigation device implements a three-level hierarchy for storing, recalling and processing cartographic data. It will be appreciated that this step may already be complete on prestored cartographic data cartridges or completed during the implementation of the system software prior to its sale.

Before any calculation or display processes are executed, the cartographic data is first divided into basic two dimensional X and Y geographic coordinates. Thus, a thoroughfare will be dictated by the X and Y coordinates it traverses. To define a particular thoroughfare, the navigation device is concerned with the change in X and Y coordinates. For example, if a thoroughfare is relatively straight, the coordinates within that thoroughfare will only change along one axis. However, if a particular thoroughfare has turns or is windy, there will be frequent changes in coordinates along both axis. The navigation device implements a mathematical formula which optimizes the storage of the change in coordinates of a thoroughfare into approximately sized equal data records. Because increased coordinate changes require additional storage space, the more changes in a thoroughfare's coordinates, the more data records the navigation device requires to store those changes.

Each coordinate change data record created by the optimizing formula is known as a feature. Within each feature data record, the navigation device creates a field storing the coordinate changes as optimized by the mathematical formula as well as a field containing the thoroughfare's principal name, fields containing the thoroughfare's alternative names and a field containing the road classification of the particular thoroughfare.

After the entire cartographic area is broken down into equal sized data features, the navigation device creates a sorted list containing the endpoints of all the feature data records. The sorted list contains four separate fields in which the feature records are sorted by that field's criteria such as alphabetically by the principal name or alternate name fields, ascending by the X-coordinates of the two dimensional endpoints of each feature record, ascending by the Y-coordinates of the two dimensional endpoints of each feature record and by a thoroughfare's classification.

The navigation device groups those features which are related or connected into a second data record known as links. To construct a link record, the navigation device will only group those feature data records that have identical principal name, alternative names and thoroughfare classification fields. If three or more features having identical fields are connected at a common point, the navigation device cannot incorporate these features into one link record and must create three or more separate link records. The unconnected feature records are grouped into isolated link data records.

At this point, the navigation device creates a third level by grouping all related link records into a network record. The navigation device creates network records by grouping any link record that contains a matching name either in the principal or the alternative name fields. The navigation device has now established a network for each named thoroughfare and stores the record in the unit's memory.

After the cartographic data is stored in memory, the navigation unit can calculate distance to a destination or display cartographic data. To calculate a distance, the unit determines the X and Y coordinates of the vehicle's current location and the coordinates of the desired final location. The navigation unit then searches the first level feature data records to determine what feature record contains the coordinates of the current location and the final destination. The unit determines if the current location and the final location are on the same feature level. If so, the processor calculates the distance between the two points by the coordinate data. If the coordinate location and the final location are not on the same feature, the navigation device then examines whether the current location and the final destination are on the same link. If so, the unit calculates the distance from feature to feature along the link. If the current location and the current destination are not on the same link, the navigation device determines whether these two locations fall within the same network. If so, the unit calculates the distance between the links along the network. If, however, the current location and the current destination are not on the same network, the navigation device defaults to a straight line calculation of the distance from the current location to the final destination. To improve the accuracy of the straight line calculation, the navigation device allows the user to designate multiple intersections over existing thoroughfares to establish a common network of thoroughfares connecting the current location and the final destination. The navigation unit can then calculate the distance between the two points either as a straight line or across the common network to determine the distance of the route. The navigation device displays the distance on the display screen and will continuously update the distance by repeating the calculation process approximately once every second.

The navigation device also utilizes the three level hierarchy to display cartographic data as a graphical map on the unit. First level feature data is the primary source the data display interface uses to represent a graphical map on the display screen. A user can point and click on any thoroughfare and the navigation device will display the principal name and the thoroughfare classification of the thoroughfare as stored in the feature data records. Additionally, the navigation device also uses the link and network records to display the segments of each thoroughfare. Therefore, the navigation unit utilizes the same feature data record, link data record and network data record to calculate distance and to display a graphical representation of the map.

These as well as other novel advantages, details, embodiments, features, and objects of the present invention will be apparent to someone skilled in the art from the following detailed description of the invention, the attached claims and accompanying drawings, listed herein below, which are useful in explaining the invention.

BRIEF DESCRIPTION OF THE DRAWINGS

The objects and features noted above are explained in more detail with reference to the drawings, in which like reference numerals are used to indicate like parts in the various views:

FIG. 6 is a flow diagram of the data construction and storage sequence implemented by the electronic navigational device of the present invention;

DETAILED DESCRIPTIONS OF THE PREFERRED EMBODIMENTS

For a better understanding of the present invention, reference may be had to the following detailed description taken in conjunction with the appended claims and accompanying drawings. In essence, the present invention enables an electronic navigational thoroughfare planning device to calculate the distance between a vehicle's current location to an established destination along an established thoroughfare. Utilizing global positioning systems (GPS) data and internal memory, the navigational device implements a three-level hierarchy for storing, recalling and processing navigational and graphical data.

Figure 1:
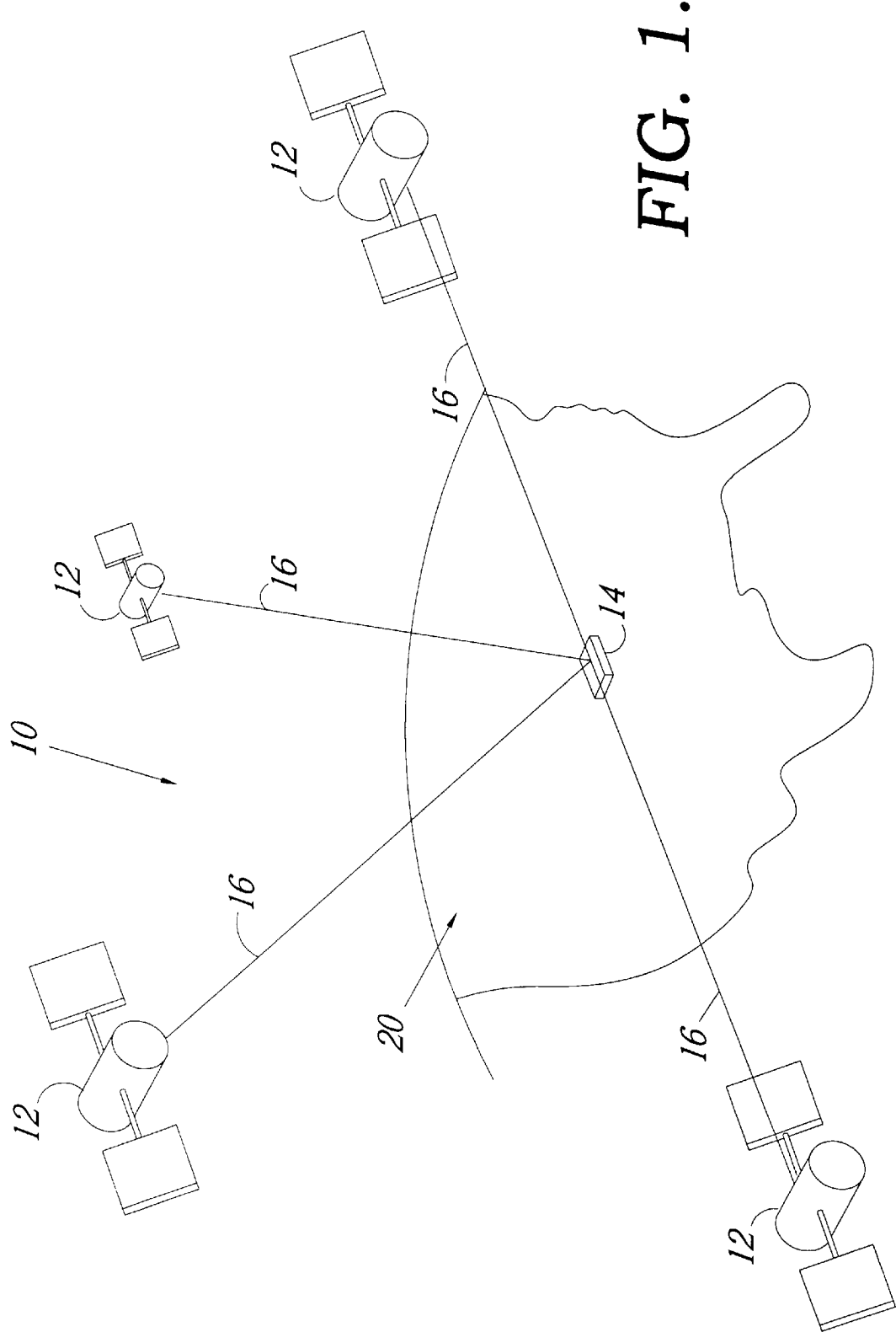
FIG. 1 is representative of a GPS system.

FIG. 1 is a representative of a GPS system, denoted generally by reference numeral 10. A plurality of satellites 12 are in orbit about the Earth 20. The orbit of each satellite 12 is not necessarily synchronous with the orbits of other satellites 12 and, in fact, is likely asynchronous. A GPS receiver device 14 of the present invention is shown receiving spread spectrum GPS satellite signals 16 from the various satellites 12.

The spread spectrum signals 16 continuously transmitted from each satellite 12 utilizes a highly accurate frequency standard accomplished with an extremely accurate atomic clock. Each satellite 12, as part of its data signal transmission 16, transmits a data stream indicative of that particular satellite 12. It will be appreciated by those skilled in the relevant art that the GPS receiver device 14 must acquire spread spectrum GPS satellite signals 16 from at least three satellites 12 for the GPS receiver device 14 to calculate its two-dimensional position by triangulation. Acquisition of an additional signal 16, resulting in signals 16 from a total of four satellites 12, permits a GPS receiver device 14 to calculate its three-dimensional position.

Figure 2:
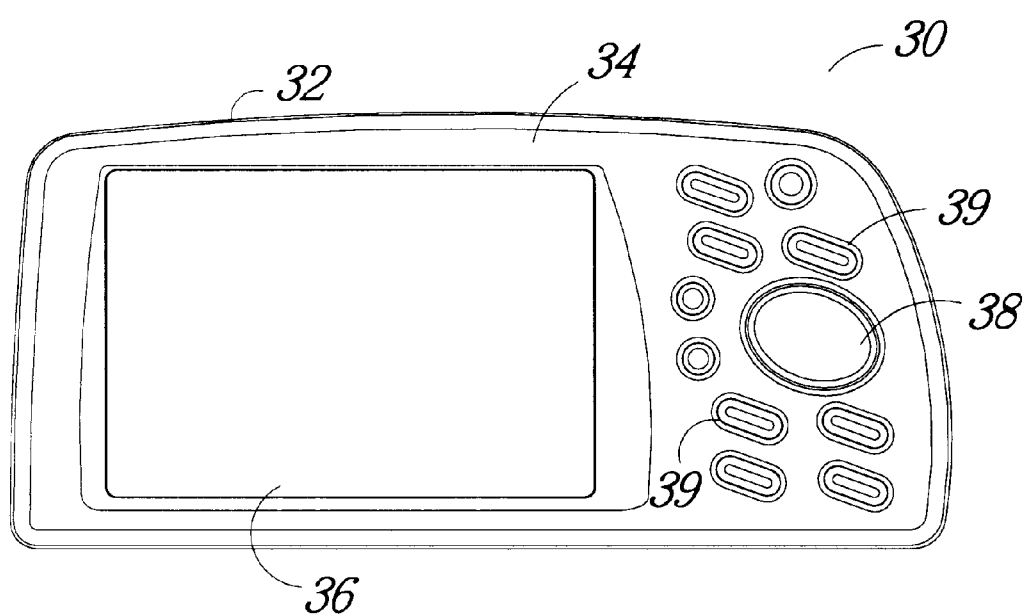
FIG. 2 is a front elevational view of the electronic navigation aid of the present invention.
Figure 3:
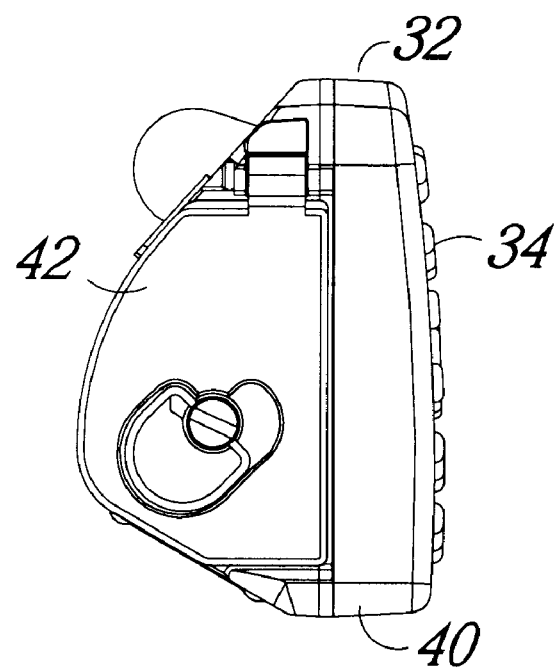
FIG. 3 is a side view of the portable electronic navigational aid of the present invention.

FIGS. 2 and 3 are representative of the portable electronic navigational aid device of the present invention, which is denoted generally by reference numeral 30. The navigational aid device has a generally rectangular housing 32 which is constructed of a resilient material and has been rounded for aesthetic purposes. The device housing 32 is defined by an outer front case 40 and a rear case 42, with the outer front case defined by a control face 34. The control face 34 has access slots for input keypad 38, which has individual keys 39, and a display screen 36. The display screen 36 is a liquid crystal display which is capable of displaying graphical information. The outer front case 40 and rear case 42 are made of one molded piece interconnecting to form the device housing 32 and support input keypad 38 and display screen 36 in their respective access slots in the control face 34.

Figure 4:
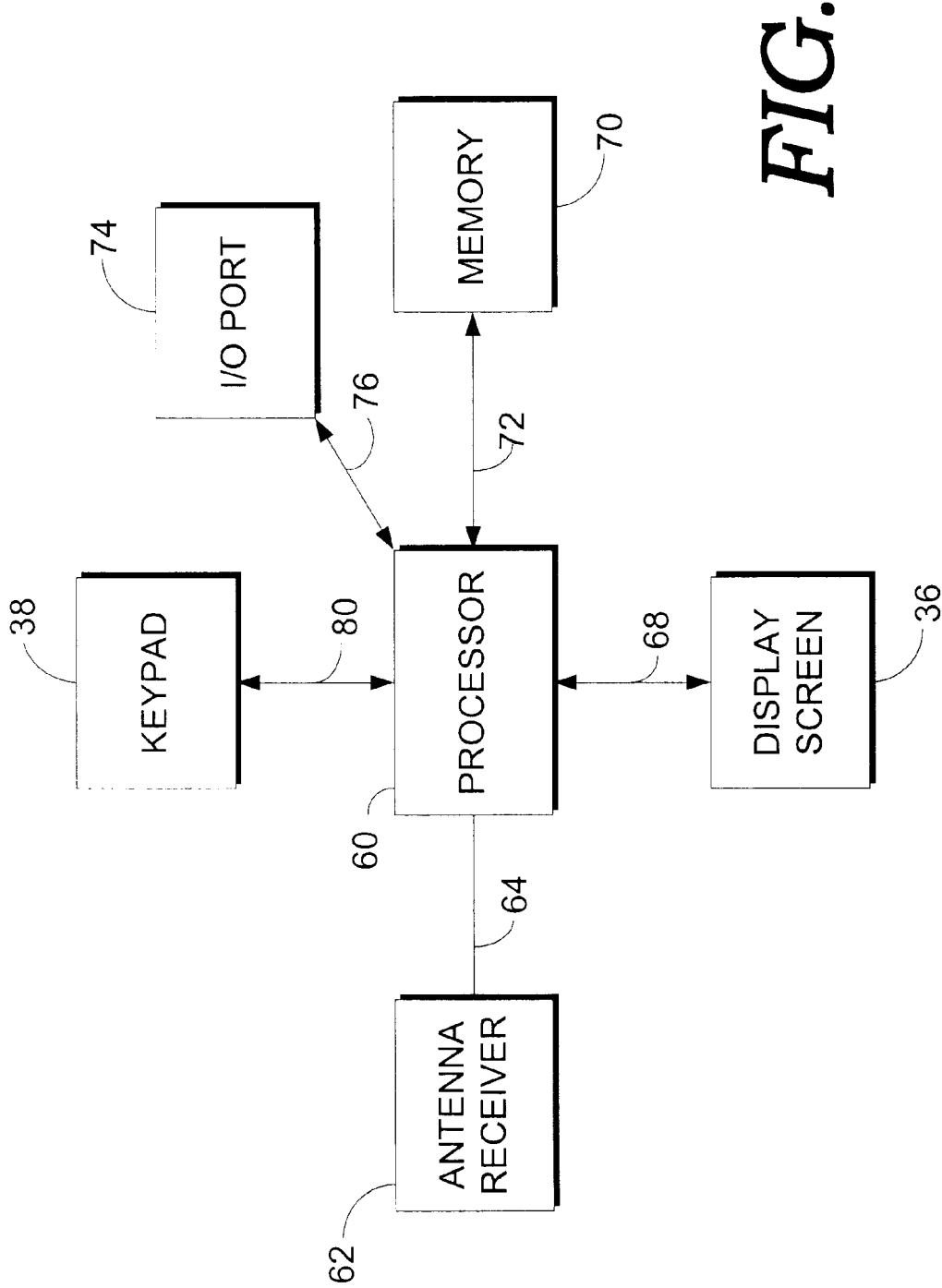
FIG. 4 is a block diagram of the typical components in a GPS receiving device.

FIG. 4 is a block diagram of the electronic circuit within the housing 32 and utilized by the portable electronic navigational aid device 30. The electronic circuit includes a processor 60 which is connected to the GPS antenna/receiver 62 via line 64. The processor 60 communicates with display screen 36 via data line 68. The memory, designated generally by numeral 70, is connected to processor 60 via data line 72. The electronic circuit further includes two input sources that are connected to the processor 60. I/O port 74 is connected via data line 76 and the keypad 38 is connected via data line 80. The electronic circuitry is powered by a power source (not shown) in a conventional manner.

Figure 5:
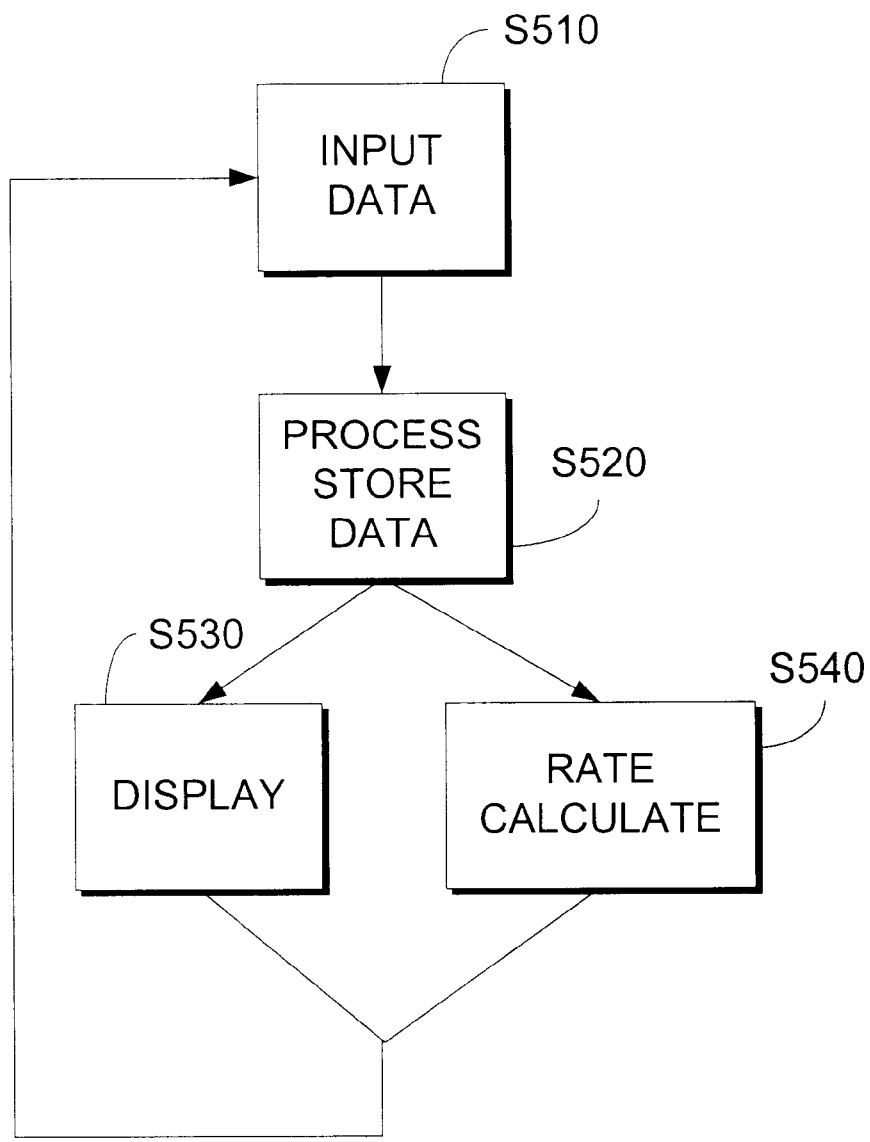
FIG. 5 is a flow diagram of the processes implemented by the thoroughfare planning device of the present invention.

FIG. 5 is a flow diagram of the storing sequence implemented by the electronic navigational device 30. The processor 60 samples input data from user input controls via the input keypad 38, the GPS receiver antenna 62 and the I/O port 74 as represented by Step S510. Via the keypad 38, the user inputs a desired final location. The antenna/receiver 62 acquires the GPS signals with which the processor 60 calculates the current position. In addition, the navigation device 30 must have cartographic data encompassing the entire area to be traversed stored in memory which may, for example, be data stored on a data cartridge utilized in conjunction with the device 10. Having received all of the inputs, the processor 60 processes and stores all data into memory 70, as illustrated in Step S520. After the optimized data is stored in memory 70, the processor 60 can utilize the data either for displaying or updating the graphical data as the vehicle proceeds as represented in Step S530 or for calculating a distance to a destination as represented in Step S540. Approximately once every second, the processor 60 will return to Step S510 to update the input parameters and perform the entire process again.

Figure 8:
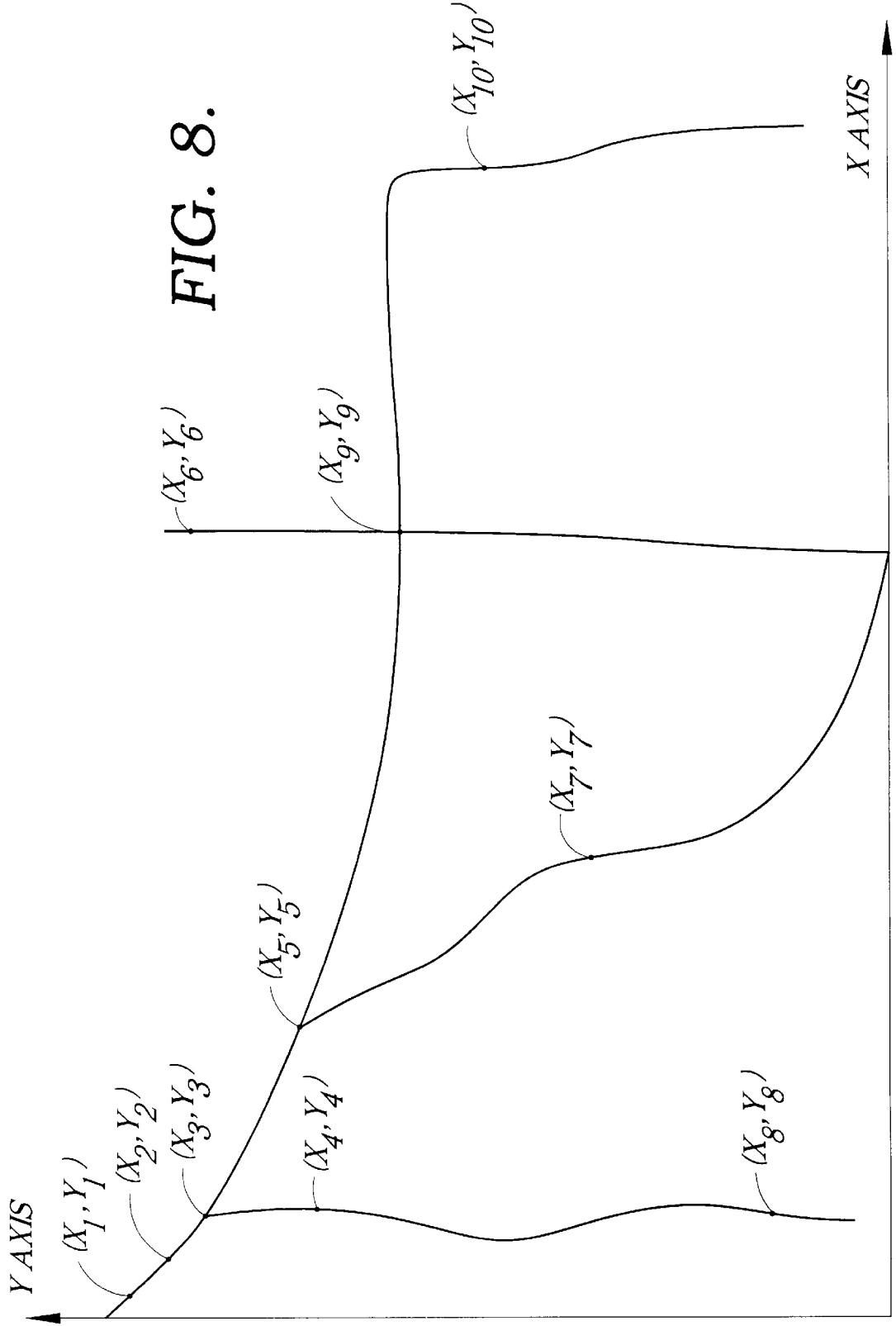
FIG. 8 is representative of a cartographic map divided into a two-dimensional X and Y coordinates.

FIG. 6 is a flow diagram representative of the data construction and storage sequence of device 10. With the cartographic data stored in memory 70, the processor 60 associates the cartographic data as two-dimensional X and Y coordinates into feature data records. FIG. 8 is representative of a cartographic map divided into two-dimensional X and Y coordinates. As demonstrated in FIG. 8, every thoroughfare is defined as a grouping of coordinate points which have separate X and Y coordinates. The construction of the cartographic data into X and Y coordinates is typically done during the software development stage and is normally included with the prestored cartographic data.

Feature data records contain data indicative of a change in the X and Y coordinates of a thoroughfare. Generally, the processor 60 has the option of defining a thoroughfare by storing every X and Y coordinate as a separate record. However, as described in a pending patent application for Geographic Coordinate Data Storage, Ser. No. 08/904,642, and incorporated by reference herein, the processor 60 can alternatively group the change in X and Y coordinates data into equal sized data records. To store the data indicate of the change in coordinates of a thoroughfare, the processor 60 defines the thoroughfare by implementing a mathematical formula in which change in coordinates of a thoroughfare are optimized and then stored. The optimization provided by the mathematical formula reduces the amount of data space needed to store a thoroughfare whose coordinates change solely in one direction. For example, a straight line of road will have a change in coordinates primarily in one direction. Therefore, the mathematical method allows a greater length of the thoroughfare to be stored in one data record. On the other hand, a road that is windy or that has many turns will have more complex coordinate changes and therefore will take up more data records to cover the same amount of distance as a straight piece of road. As such, the processor 60 breaks up the road segments located within the cartographic data into approximately equal sized records and stores the data as a feature record.

Figure 9:
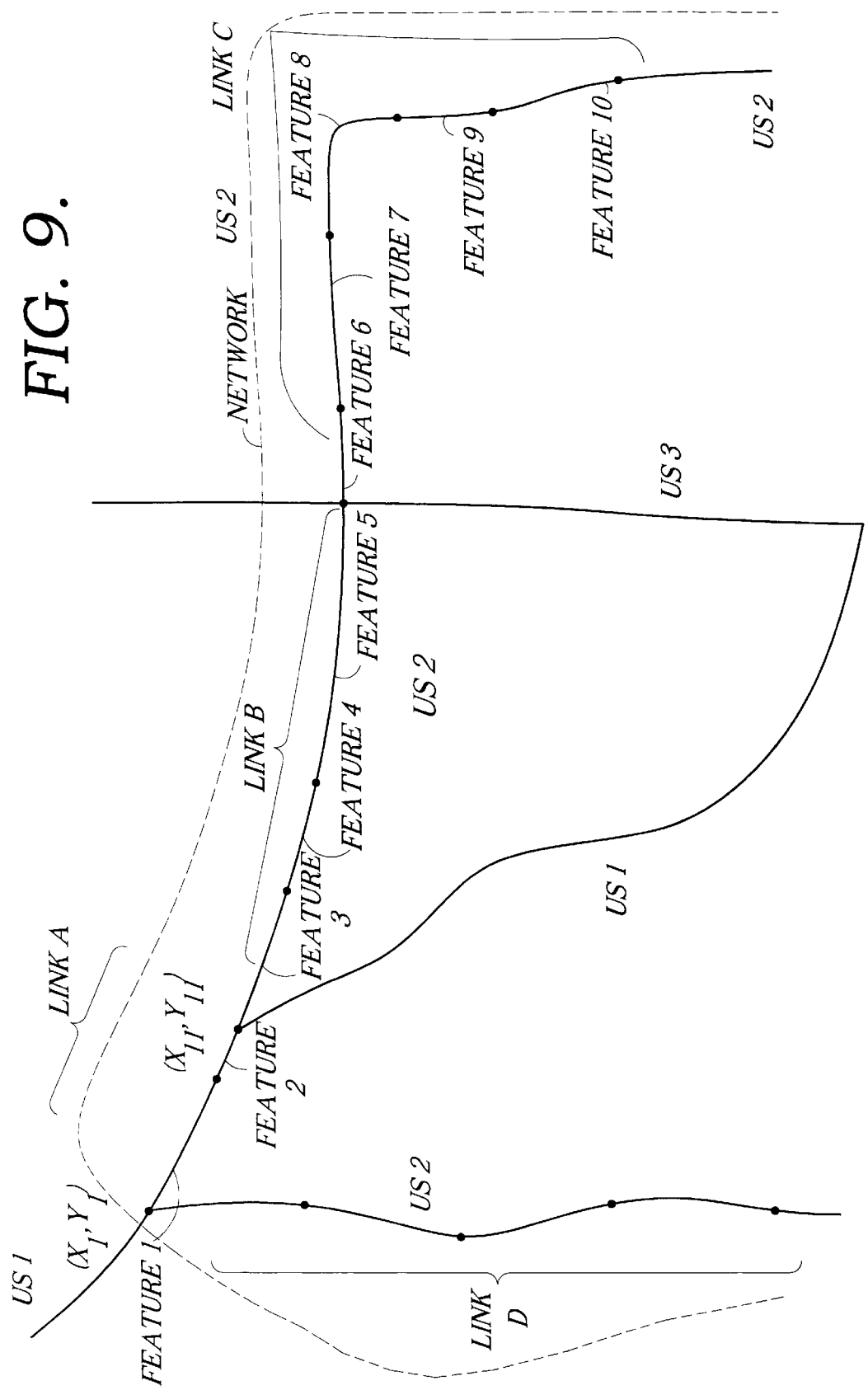
FIG. 9 is representative of a cartographic map divided into feature, link and network records.

FIG. 9 is representative of a cartographic map divided into feature, link and network records. As demonstrated in FIG. 9, a sample thoroughfare has been divided into features 1–10 as hypothetically optimized by the mathematical formula. Each feature is different in the amount of thoroughfare contained within the feature because of the different geographic characteristics encompassed within each feature. As demonstrated in FIG. 9, feature 1 is defined by coordinate endpoints X1, Y1 and X11, Y11. Each feature record stores the coordinates of the two endpoints and the distance across those endpoints defining the individual feature. This step is characterized in FIG. 6 as Step S610.

Feature data records also contain the thoroughfare classification of a thoroughfare between the space defined by the coordinate endpoints. In this regard, every thoroughfare is classified in terms of separate classes depending on the inherent characteristics of the thoroughfare. For example, in U.S. terminology, an interstate highway may be the first class, a four-lane state highway may be the second class, a two-lane highway may be the third class, a boulevard or trafficway may be the fourth class, a city street may be a fifth class and a nonpaved road may be a sixth class. As a thoroughfare traverses the cartographic area, it may have several different thoroughfare classifications. For example, a four lane highway may turn into a two lane highway.

Continuing the feature record construction, the processor 60 creates a name group for each level one feature data record as defined in Step S620. To create a name group, the processor 60 scans the cartographic area identifying the principal names and alternate names of all the thoroughfares encompassed in the cartographic area. Name groups will often be either a numerical symbol or a typical road name such as Main Street or Broadway. Every name identified by the processor 60 is used to sort the feature data in the second and third hierarchical level. For example, a scan of the cartographic area defined in FIG. 9 would identify US1, US2 and US3 as the three principal name or alternative name groups. After identifying all of the potential principal and alternative names, the processor 60 stores the principal name and any alternative name representing each feature in the appropriate field of the feature data record.

Having created individual feature records for all of the thoroughfares contained within the cartographic data, the processor 60 creates a sorted list in order to construct the second level in the hierarchical structure. The processor 60 creates the sorted list by building a list containing the two-dimensional X and Y coordinate thoroughfare endpoints of all the feature data records. This step is represented as Step S630. Because the processor 60 needs to sort the feature data records by different criteria depending on the navigation function being implemented, the sorted list contains four fields to accommodate the different functions. The processor 60 creates the first field of the sorted list by organizing the individual feature records alphabetically by name group as represented in Step S640. The second field in the sorted list is created by sorting the feature records by ascending X-coordinates. As demonstrated in FIG. 8, the X axis of the cartographic map runs from left to right. Therefore, the left most X-coordinate is zero and then ascending to the right most coordinate. To sort the feature records by ascending X-coordinate, the processor 60 begins with the left most X-coordinate and group those features by ascending X-coordinate. Because some of the features can have the same X-coordinate endpoints, feature records with the same X-coordinate endpoints will be stored sequentially. This step is represented as Step S650. In Step S660, the processor 60 sorts the feature data by ascending Y-coordinate to create a third field of the sorted list. As represented in FIG. 8, the Y axis runs from bottom to top with the bottom most coordinate being zero and ascending upward. To sort the list by ascending Y-coordinate, the processor 60 begins with the bottom most Y-coordinate end groups to feature by ascending Y-coordinates. Similar to the X-coordinate sorting, many features will have the same Y-coordinate and will be grouped sequentially. The processor 60 sorts the feature records by thoroughfare classification to create the fourth field of the sorted list as represented in Step S670. Having created the four fields, the processor 60 compiles the complete sorted list as represented in Step S680 and stores the sorted list in memory 70.

To create the second level of the hierarchical structure, known as link records, the processor 60 groups feature record data that has identical principal name, alternative names and thoroughfare classification fields. The processor 60 has no limit as to how many feature records are contained within a single link record, and the processor 60 may create as many link records as are necessary. However, new link records must be created at every intersection where three or more features having matching fields meet. The processor 60 creates a new link record for each feature sharing the common point.

To accomplish this, the processor 60 scans through the sorted list X-coordinate and Y-coordinate fields to logically organize all of the adjacent endpoints. For example, the processor 60 may begin with the west most coordinate of a thoroughfare on the map and piece together segments in a easterly fashion. As demonstrated in FIG. 8, the west most coordinate is represented when the X-coordinate is zero. The processor 60 determines adjacent endpoints by examining the X-coordinate and the Y-coordinate fields of the sorted list. Because all thoroughfares run in a directional manner, it is advantageous to have the feature data records organized so that adjacent features can be grouped together. This step is represented in Step S690.

After constructing the logical order of feature records into a direction based organization, the processor 60 utilizes the name group field and the thoroughfare classification field to match identical feature records. At any point when adjacent feature data records do not have identical principal name, alternative name and thoroughfare classification fields, the processor 60 creates a new link record. The processor 60 stores the link id in a field in memory 70 for all the feature records encompassed by the link. Additionally, the length of each link is stored in the link record. All matching feature records are now organized as link records as represented in Step S6100. FIG. 9 represents an example of how the features are grouped into links. Because feature 1 and feature 2 have identical matching principal names, alternative names, and thoroughfare classifications they are grouped into link A. However, features 3, 4 and 5 have different principal names and alternate names and therefore they must be grouped into a different link, link B. For example, if US2 converts from a four lane highway at feature 5 to a two-lane road at feature 6, features 6, 7, 8 and 9 are grouped into a different link, link C.

Having created link records, the processor 60 creates the third level of the hierarchical structure, known as a network record, utilizing the name group field of the sorted list. Each network record contains groupings of all related and connected link records which share at least one matching name in the principal name or alternate name field. Because the feature records are already grouped in a directional order, this is the broadest of the three levels and establishes a thoroughfare along the entire area contained within the cartographic data. This step is represented as Step S6110. Similar to link record grouping, there is no limit in the amount of link records that can be included into a network record and the network record contains all the links encompassed by the network. Because the network record is the broadest of the hierarchical structure, a network record can incorporate three links connected at one point and any given link can be a member of more than one network. At this point, the processor 60 has established a three-level hierarchical structure and stores a network id in a field in memory 70 for use in either graphical representation by display screen 36 or for navigation calculation purposes. FIG. 9 represents an example of how the links are grouped into networks. From the previous example, links A, B, C and D all have US2 as a common name. Therefore, in constructing a network record all of these links have at least one matching name and would therefore be considered network US2. Network US2 is represented on FIG. 9 as a dotted line.

The display screen 36 utilizes the three-level hierarchical structure to access the feature, link, and network data records from memory 70. The processor 60 utilizes feature data records to locate the coordinates of all the thoroughfares on a graphical screen. Having represented all of the road segments within those features, the processor 60 interconnects those features grouped together in the link records. At this point, the display screen has information of individual links along a particular thoroughfare. Finally, the processor 60 interconnects those links grouped into a network to display the entire thoroughfare located in the cartographic memory. Therefore, the processor 60 and the display screen 36 utilize the three-level tier data to graphically display the cartographic map from the display screen 36.

Additionally, the processor 60 accesses the feature data when a user desires the principal name and thoroughfare classification of a thoroughfare by designating any location along the thoroughfare on the display screen 36 via keypad 38. When a user designates a location on the display screen 36, the processor 60 relays the principal name and the thoroughfare classification fields of the feature data record for the feature encompassing the designated point. The display screen 36 will create a small pop up window displaying the principal name of the thoroughfare that the designated point touches.

Figure 7:
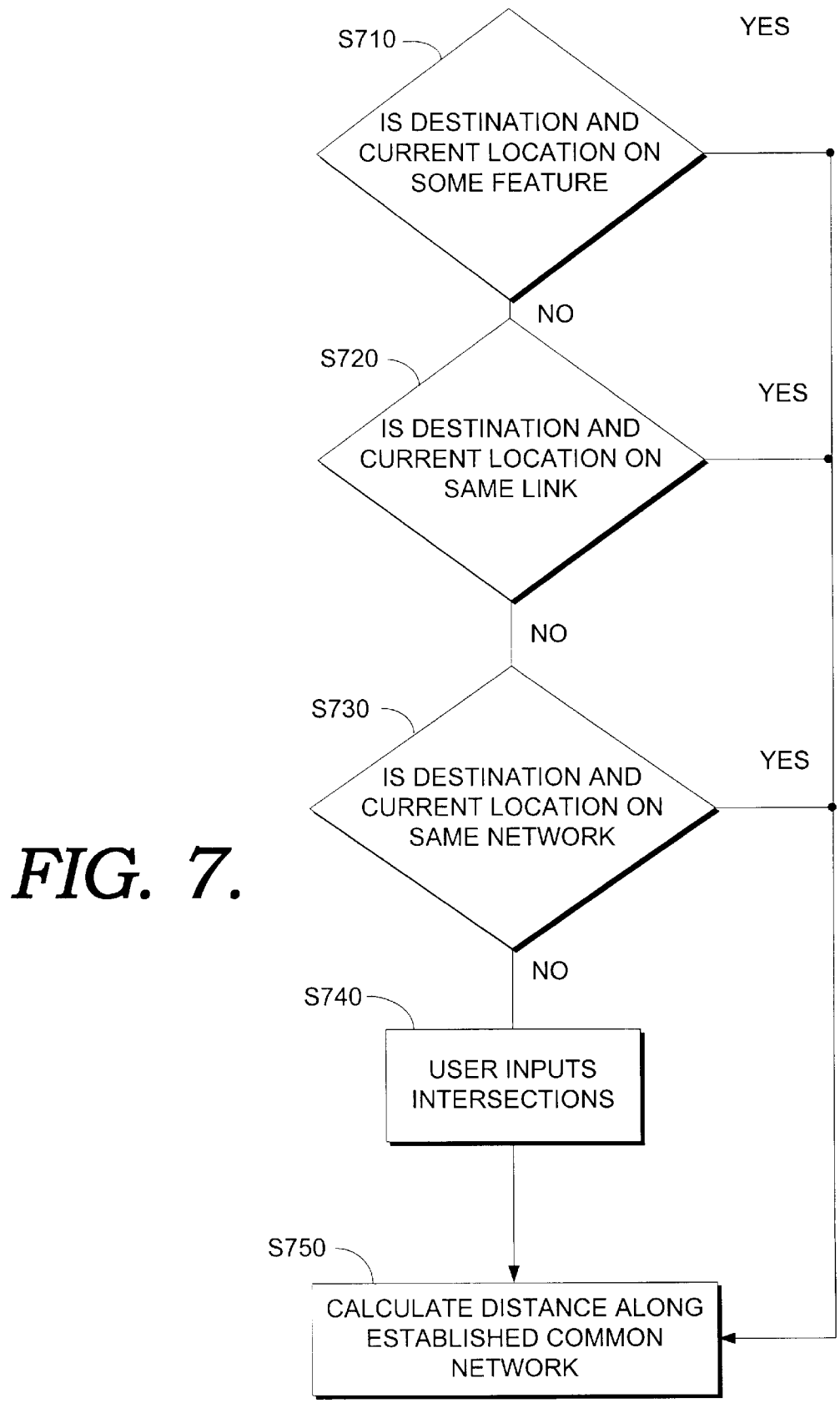
FIG. 7 is a flow diagram of the thoroughfare planning method implemented by the present invention.

In a similar fashion, the processor 60 also utilizes the three-level hierarchical structure to calculate the navigational route with the cartographic data. FIG. 7 is a flow diagram of the route planning method implemented by the present invention. To begin the route planning method, a user activates the system by entering a desired destination via keypad 38 by manipulating a cursor to the desired destination and entering that location into the device 10. The processor 60 converts the desired destination into coordinates. Alternatively, the system may implement touch screen or light pens or any other input device. Having been activated, the processor 60 receives the GPS satellite data with antenna/receiver 62 and the calculates the vehicle's current position as coordinates on the cartographic map.

Figure 10:
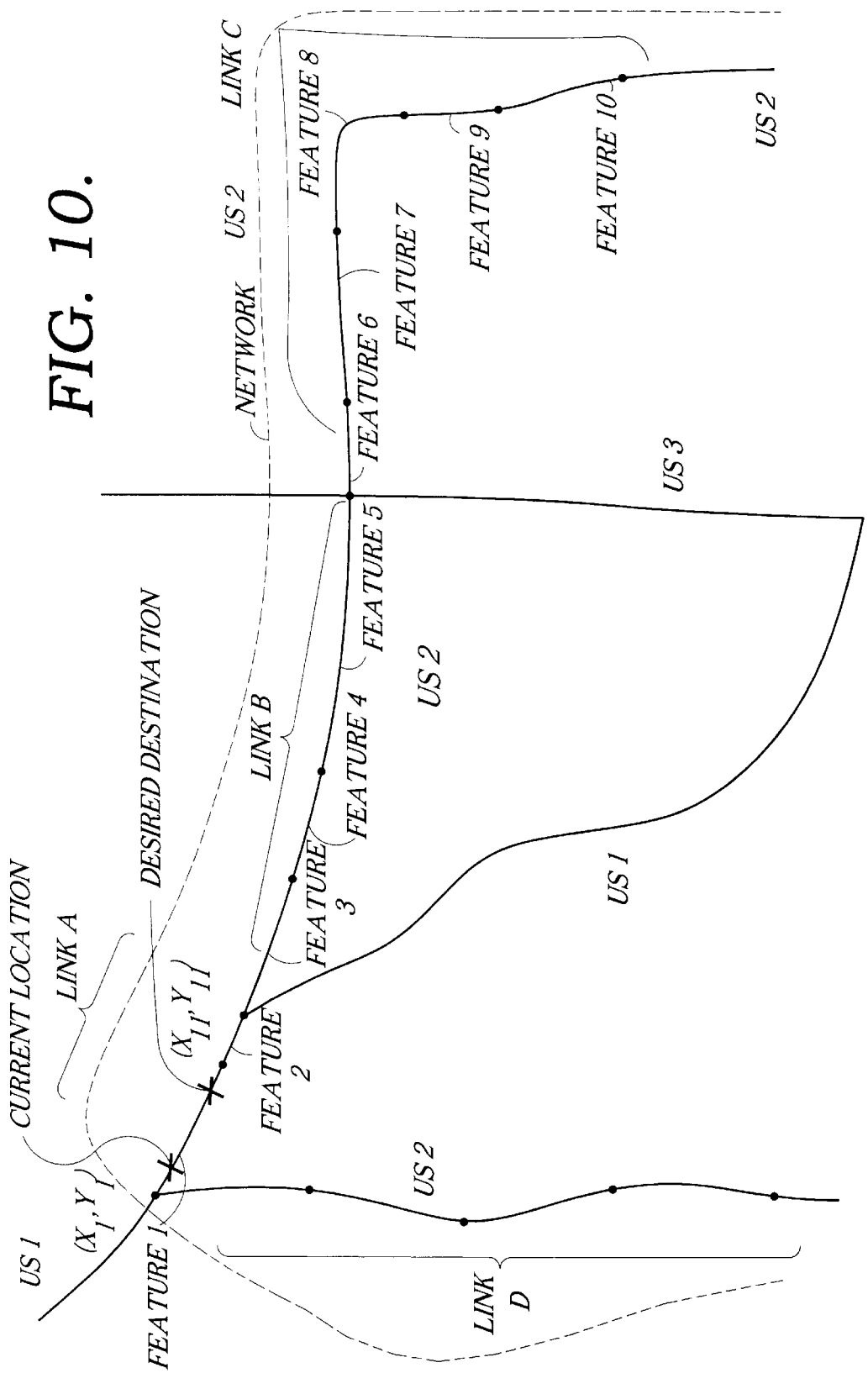
FIG. 10 is representative of a cartographic map divided into feature, link and network records.

After establishing the coordinates of both locations, the processor 60 examines the feature data located in memory 70 to determine if the current location and the desired location are located within the same feature record. This is designated as Step S710. If both locations are located within the same feature record, the processor 60 establishes a common network between the current location and the final destination and calculates the distance along the common network utilizing the distances stored in the feature records as represented in Step S750 FIG. 10 is representative of the cartographic map divided into feature, link, and network records. In this situation, the current location and the desired destination are both located in feature 1. The processor 60 establishes a common network within the feature and uses the coordinate date stored within that feature to calculate the route distance from the current location to the desired destination.

Figure 11:
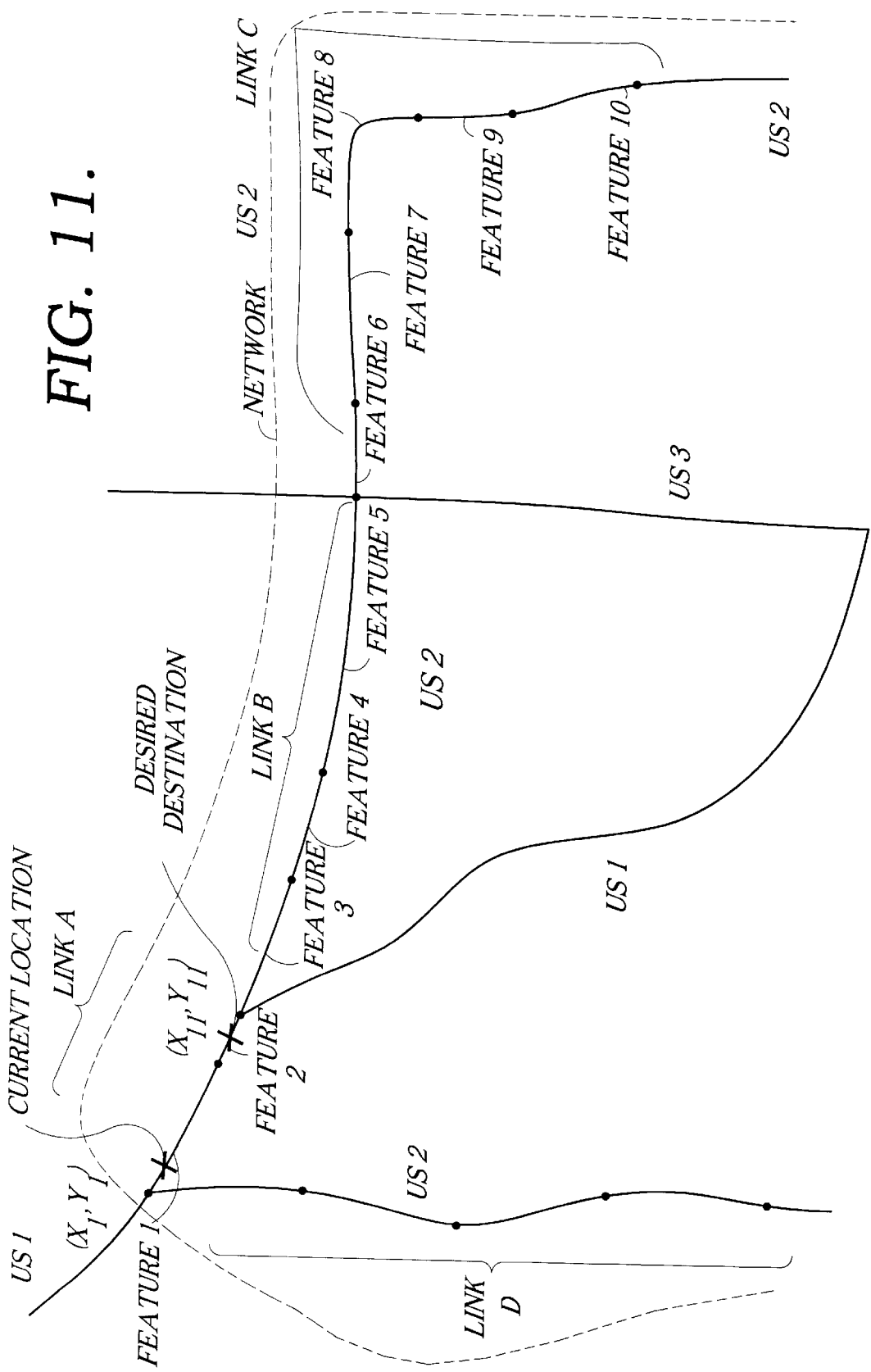
FIG. 11 is representative of a cartographic map divided into feature, link and network records.

If the desired destination and the current location are not on the same feature, the processor 60 examines whether the destination and the location are on the same link as represented in Step S720. The processor 60 uses the link id stored in the link field of each feature to compare whether each feature is on the same link. If the feature encompassing the desired destination and the feature encompassing the current location have identical principal name, alternate name and thoroughfare classification, then they are on the same link. If so, the processor 60 establishes a common network between the desired destination and the current location and will calculate the distance between the two points utilizing the distances stored in the link records as represented in Step S750. FIG. 11 is representative of a cartographic map divided into feature, link, and network records. In this example, the current location is located within feature 1 while the desired destination is located within feature 2. Because the two points are not within the same feature, the processors 60 determines whether they are on the same link. Because feature 1 and feature 2 share the same principal name, alternative name and thoroughfare classification they are in link A and therefore processor 60 establishes a network between feature 1 and feature 2. Thus, the processor 60 calculates the distance between the two points.

Figure 12:
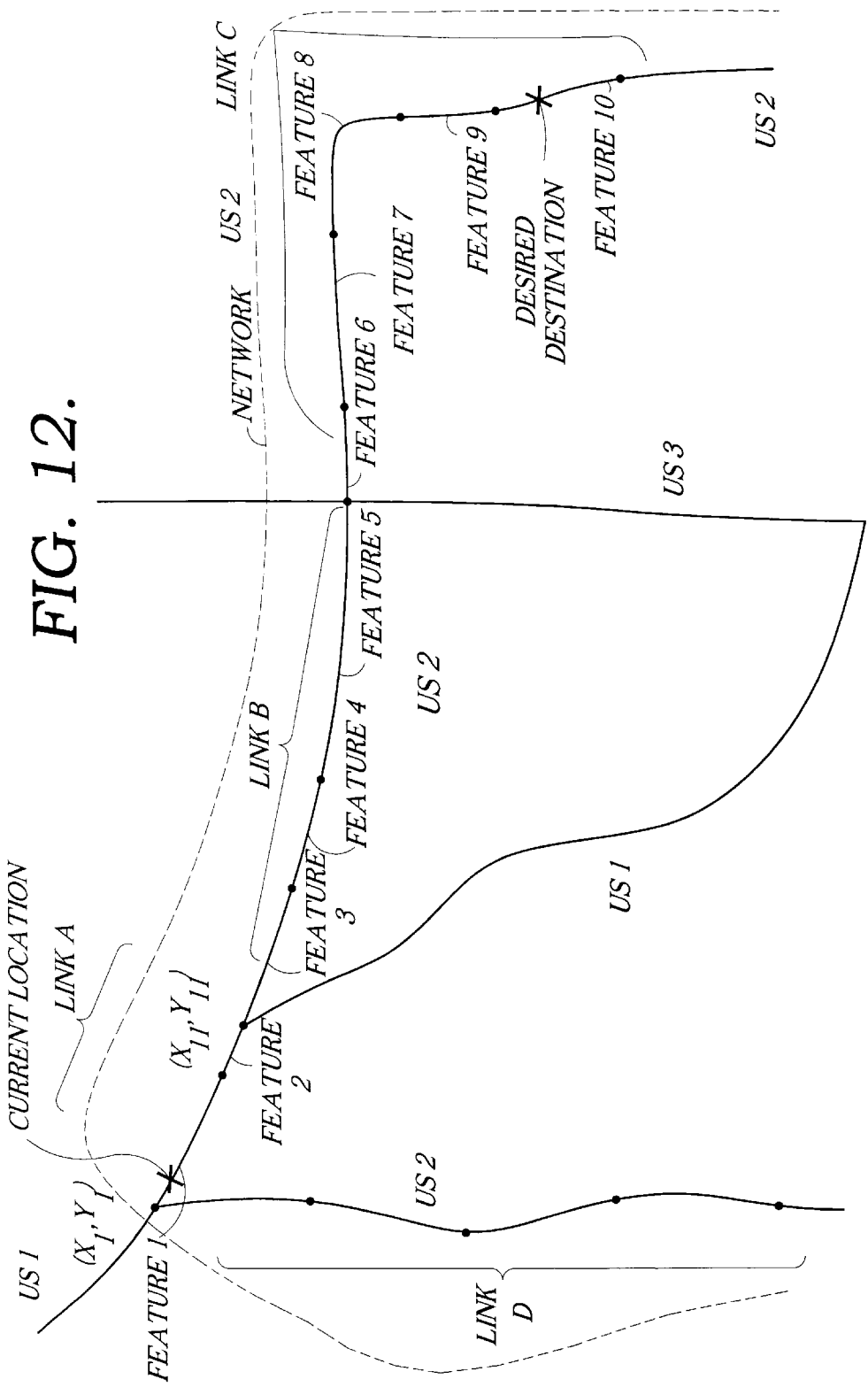
FIG. 12 is representative of a cartographic map divided into feature, link and network records.

If the feature encompassing the desired destination and the feature encompassing the current location do not have identical names or thoroughfare classification, the processor 60 examines whether the link encompassing the desired destination and the link encompassing the feature of the current location are on the same network. This is represented as Step S730. The processor 60 determines if each link has a matching network id field. If any network id field matches, then the desired destination and the current location are in the same network and the processor 60 establishes a common network and can calculate the distance utilizing the distances stored in the network record as established in Step S750. FIG. 12 is representative of a cartographic map divided into the feature, link, and network records. In this example, the current location is located in feature 1 on link A while the desired destination is located in feature 10 on link C. Because the two points are not within the same feature or link, the processor 60 determines whether they are on the same network. In this case, because both feature 1 and feature 10 share US2 as a common name or alternate name, they are in the network record US2 and the processor 60 calculates the distance along link A, B, and C to calculate the desire to route. On the occasion that more than one network record is a match, the processor 60 defaults to the network record corresponding with the current location's or desired destination's primary name. If no network record contains the current location's or desired destination's primary name, the processor 60 establishes a default network by random selection. It will be appreciated that different default criteria could be implemented. If, however, there are no matching names, the desired destination and the current location are not on the same network.

Figure 13:
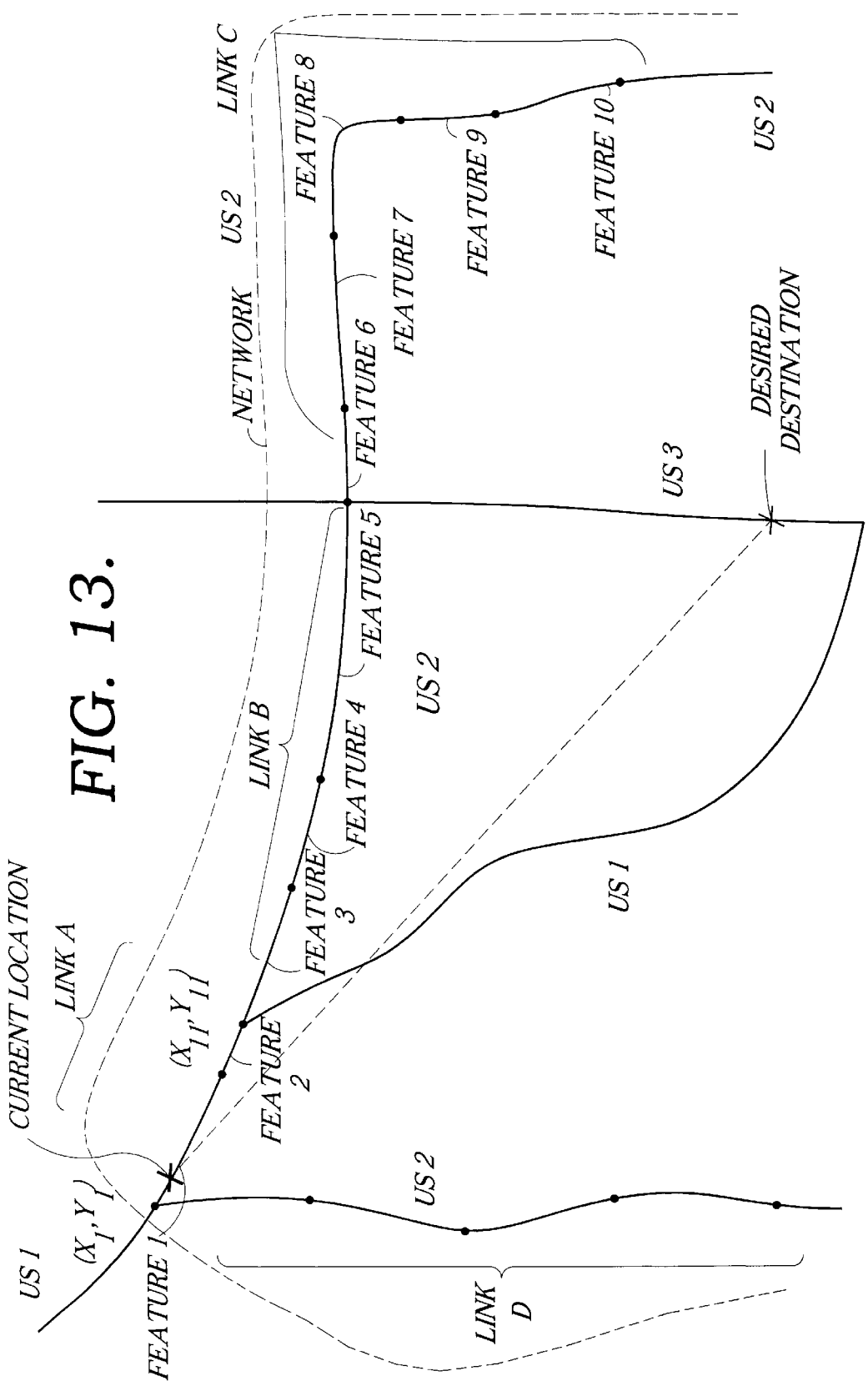
FIG. 13 is representative of a cartographic map divided into feature, link and network records.

If the two points are not contained within the same network record, the processor 60 defaults to a straight line method of distance calculation. At this point, the user has the option of designating one or more intersections via keypad 38 to establish a common network. This is represented as Step S740. Initially, the processor 60 displays a straight line from the current location to the desired destination on the display screen 36 along with a cursor. The user can then manipulate the cursor via keypad 38 to lock the cursor on the straight line and begin bending the line towards an intersection between two established thoroughfares. After designating an intersection, the processor 60 uses the networks and the distances stored within the records designated by the intersection to calculate the distance to the destination. The user may continue entering as many thoroughfare intersections as desired. As soon as the user has finished establishing intersections, if any, the processor 60 now has a common network of either the straight line or multiple networks and can calculate the distance along the established common network as specified in Step S750. FIG. 13 is representative of the cartographic map divided into feature, link and network records. In this example, the current location is on feature 1 on link A, and network US2. The desire destination is not on either the same feature, link, or network record. At this point, the processor 60 can not establish a common network and defaults to a straight line method of calculation as indicated by the dotted line. At this point the user will have the option of leaving this as the route calculated by the processor or may adjust the dotted line via the keypad 38 so that it intersects network US2 and network US3 indicated in FIG. 13.

After calculating the distance across the common network, the processor 60 displays the distance on display 36 in terms of distance to location. The processor 60 samples the GPS data from the antenna/receiver 62 on the average of about once every second to monitor the progression of the vehicle. The processor 60 will constantly update the display screen 36 on a real time basis. It will be appreciated that different sample times and display formats are within the scope of the present invention.

In the foregoing specification the present invention has been described with reference to specific exemplary embodiments thereof. The dimensions considered have been described in such full, clear, concise and exact terms as to enable a person of ordinary skill in the art to make and use the same. It will be apparent to those skilled in the art that a person understanding this invention may conceive of changes or other embodiments or variations, which utilize the principals of this invention without departing from the broader spirit in scope of the invention as set forth in the dependent claims. All are considered in the sphere, spirit and scope of the invention. The specification drawings are, therefore to be regarded in an illustrative rather than restrictive sense. Accordingly it is not intended that the invention be limited except as be necessary in view of the dependent claims or their equivalents, which particularly point out and distinctly claim the subject matter applicants regarded their invention.

Having thus described the invention, what is claimed is:

1. An electronic navigation device for planning a route over at least one of a plurality of thoroughfares, from a starting location to a selected destination, said device comprising:
   a processor;
   a memory connected to said processor, said memory having data indicative of said thoroughfares, wherein each of said thoroughfare has a plurality of associated features, wherein selected features are associated to form links of features, and wherein selected links are associated to form networks of links,
   wherein said processor determines whether said selected destination and said starting location are within the same said feature, and when said selected destination and said starting location are within the same said feature, said processor defines said route on said common feature;
   when said selected destination and said starting location are not within the same said feature, said processor determines whether said selected destination and said starting location are within the same said link and, when said selected destination and said starting location are within the same said link, said processor defines said route on said common link; and
   when said selected destination and said starting location are not within the same link, said processor determines whether said selected destination and said starting location are on the same network and, when said selected destination and said starting location are on the same network, said processor defines said route on said common network.

2. The electronic navigation device as set forth in claim 1, wherein, when said selected destination and said starting location are not within a common network, said processor establishes a straight line from said starting location to said selected destination and permits a user to input at least one intersection of two networks to establish a common network.

3. The electronic navigation device as set forth in claim 1, in combination with a moving vehicle, wherein said processor establishes said starting location as a current location of said device as calculated by said processor.

4. The electronic navigation device as set forth in claim 3, wherein said current location is calculated at periodic intervals.

5. The electronic navigation device as set forth in claim 4, wherein said periodic interval is once every second.

6. The electronic navigation as set forth in claim 4, wherein said current location is utilized to update said route distance.

7. An electronic navigation method for planning a route over at least one of a plurality of thoroughfares, from a starting location to a selected destination, said method comprising:
   associating a plurality of features with each said thoroughfare;
   associating said selected features to form lengths of features;
   associating selected said lengths of features to form networks of said lengths;
   determining whether said selected destination and said starting location are within the same said feature, and when said selected destination and said starting location are within the same said feature, defining said route on said common feature;
   when said selected destination and said starting location are not within the same said feature, determining whether said selected destination and said starting location are within the same said link and,
   when said selected destination and said starting location are within the same said link, defining said route on said common link; and
   when said selected destination and said starting location are not within the same said link, determining whether said selected destination and said starting location are on the same network and, when said selected destination and said starting location are on the same network, defining said route on said common network.

8. A navigation device comprising:
   a processor;
   a display, connected to said processor;
   a memory connected to said processor, said memory containing cartographic data, including a thoroughfare having a name, wherein at least a portion of said thoroughfare is displayed on said display; and
   an input, said input being operable to identify any point on said portion of said thoroughfare displayed on said display, whereupon such identification said processor retrieves said name of said thoroughfare from said memory and displays said name on said display.

9. The navigation device of claim 8, wherein said thoroughfare has a thoroughfare classification and a cartographic set of two-dimensional coordinates and wherein said processor retrieves and displays said name of said thoroughfare from said memory and at least one of said thoroughfare classification and said two-dimensional coordinates.

10. A cartographic data storage device comprising:
    a plurality of first level records, wherein each record in said first level contains at least one of a name of a thoroughfare, a thoroughfare classification of a thoroughfare, and data indicative of a change in cartographic coordinates of a section of said thoroughfares;
    a plurality of second level records, wherein each of said records in said second level contains selected records of said first level; and
    a plurality of third level records, wherein each said record on said third level contain records of said second level having a matching said name,
    wherein a sorted list containing a field sorted by said name, a field sorted by an X-coordinate of said cartographic coordinates, a field sorted by a Y-coordinate of said cartographic coordinates, and a field sorted by said thoroughfare classification is utilized to construct said second level records and said third level records.

* * * * *